United States Patent
Sacks et al.

(10) Patent No.: US 11,578,490 B2
(45) Date of Patent: Feb. 14, 2023

(54) LATH WITH FLATTENED TABS

(71) Applicant: Structa Wire ULC, Vancouver (CA)

(72) Inventors: Abraham Jacob Sacks, Vancouver (CA); William Spilchen, Surrey (CA)

(73) Assignee: Structa Wire ULC, Vancouver (CA)

( * ) Notice: Subject to any disclaimer, the term of this patent is extended or adjusted under 35 U.S.C. 154(b) by 209 days.

(21) Appl. No.: 17/078,930

(22) Filed: Oct. 23, 2020

(65) Prior Publication Data

US 2021/0121938 A1    Apr. 29, 2021

Related U.S. Application Data

(60) Provisional application No. 62/926,346, filed on Oct. 25, 2019.

(51) Int. Cl.
*E04C 5/04* (2006.01)
*B21F 27/12* (2006.01)
*B23K 11/00* (2006.01)
*E04F 13/04* (2006.01)
*E04C 5/06* (2006.01)

(52) U.S. Cl.
CPC .............. *E04C 5/04* (2013.01); *B21F 27/12* (2013.01); *B23K 11/008* (2013.01); *E04C 5/0636* (2013.01); *E04F 13/045* (2013.01); *E04F 13/047* (2013.01)

(58) Field of Classification Search
CPC ......... B21F 27/10; B23K 11/008; E04C 5/04; E04C 5/0636; E04F 13/045; E04F 13/047; Y10T 29/49625
See application file for complete search history.

(56) References Cited

U.S. PATENT DOCUMENTS

| | | | | |
|---|---|---|---|---|
| 600,352 | A * | 3/1898 | Bell | ..................... D03D 25/00 256/45 |
| 1,973,113 | A * | 9/1934 | Schulz | ................. B23K 11/008 52/669 |
| 2,269,869 | A * | 1/1942 | Specht | ..................... D21F 1/10 139/425 A |
| 3,252,263 | A * | 5/1966 | Korf | ........................ E04C 5/04 52/309.3 |
| 4,122,228 | A * | 10/1978 | Tolliver | .................. B29C 70/24 428/101 |
| 6,305,432 | B1 | 10/2001 | Sacks et al. | |
| 8,720,142 | B2 | 5/2014 | Spilchen | |
| 9,797,142 | B1 | 10/2017 | Sacks et al. | |

(Continued)

FOREIGN PATENT DOCUMENTS

| | | | | |
|---|---|---|---|---|
| EP | 1213069 A2 * | 6/2002 | ............ | B21F 27/005 |
| GB | 2299100 A * | 9/1996 | ............ | B21F 27/005 |
| KR | 101273189 B1 * | 6/2013 | | |

(Continued)

*Primary Examiner* — Jessie T Fonseca
(74) *Attorney, Agent, or Firm* — Cozen O'Connor

(57) ABSTRACT

A manufacturing assembly and method produce a wire mesh including a plurality of longitudinal members and a monolithic transverse member secured to the plurality of longitudinal members. The monolithic transverse member includes a plurality of transverse portions that define a first cross-sectional shape, and further includes a plurality of longitudinal portions that define a second cross-sectional shape different than the first cross-sectional shape.

14 Claims, 5 Drawing Sheets

(56) References Cited

U.S. PATENT DOCUMENTS

2014/0053495 A1* 2/2014 Spilchen ............... E04F 13/045
                                                    29/897.31
2015/0197939 A1* 7/2015 Ogden .................. E04F 13/047
                                                    52/343

FOREIGN PATENT DOCUMENTS

| WO | WO-03064774 | A1 | * | 8/2003 | ......... E02D 29/0241 |
| WO | WO-2008088231 | A1 | * | 7/2008 | ............ B21F 27/005 |
| WO | WO-2014117214 | A1 | * | 8/2014 | ............... E04C 5/04 |

* cited by examiner

LATH WITH FLATTENED TABS

TECHNICAL FIELD

The present disclosure relates generally to wire meshes, and more specifically to wire meshes formed using continuous transverse wires.

DESCRIPTION OF THE RELATED ART

Laths, including wire meshes, are formed from longitudinal wires or strands and transverse wires or strands that are coupled together, for example by resistance welding, at their intersections. Examples of known wire meshes are described in U.S. Pat. Nos. 6,305,432; 8,720,142; and 9,797,142, the disclosures of which are hereby incorporated by reference in their entireties.

Usually, the transverse strands are individual strands that terminate at the outer edges of the wire mesh width. In some cases, these transverse strands are pre-straightened and cut to a desired length in a separate machine. These pre-straightened and cut strands are subsequently placed in a hopper at the welding machine where they are individually dropped into the welding position. These strands can be cut to a desired length and positioned accurately such that opposing ends of the strands are flush with the outermost ones of the longitudinal wires and thus do not require trimming. There is no waste material with this method, but such straighteners are slow and cannot keep up with high speed welding machines.

In other methods, the transverse wires are introduced in line with the welding machine itself. The transverse wires pass through straighteners, are cut to lengths longer than required, and introduced into the welding position. Achieving an exact, desired length is difficult at the cycle speeds of most welders, which leads to cutting lengths longer than the desired length to allow for any variation in length accuracy. Consequently, these transverse wires are trimmed after welding, resulting in some waste material. This increase in waste material is offset by an increase in efficiency resulting from the elimination of a separate manufacturing step for the transverse wires. The length tolerance is kept longer to lower the chances of one of the transverse wires being shorter than the desired length, as such a defect may result in an entire sheet or roll of mesh wire being scrapped.

In yet another method, the transverse wires may be continuous. A reciprocating loom device travels back and forth and lays the transverse wire onto a mechanism that would advance the wire into the weld position. This process results in loops or tabs being created at each lateral end of the wire mesh. These loops or tabs are substantially parallel to the longitudinal wires. One advantage of this method is that high operating speeds can be achieved, especially with smaller wire diameters, for example in the 16 gauge (about 0.064 in.) to the 20 gauge (about 0.034 in.) range.

In many cases, the tabs are trimmed off adjacent to the outermost longitudinal wires. This results in scrap loss, but is still economical as a result of higher operating speeds and no scrap losses due to misfeeds with smaller wire diameters.

According to some methods, the tabs are left intact as part of the finished wire mesh. This results in the most economical combination. If the wire mesh is measured and sold by mesh area, the overall width including the tabs on the mesh may be used in the area calculation. If the wire mesh is measured and sold by weight, the weight of the tabs may be used in the weight determination.

One of the disadvantages of continuous transverse wire mesh configurations is that when the wire mesh is packaged in rolls, the tabs start to exhibit circular memory. This behavior is exacerbated by longer tabs, larger wire diameters, longer transverse wire spacing, smaller roll diameters, or any combination thereof.

This circular memory is a problem when the wire mesh is unrolled and installed, as it may be desirable for the wire mesh to lay flat against a substrate, for example if the wire mesh is used for a stucco lath. In these cases, each of the tabs will project away from the substrate.

In some circumstances, wire meshes can be forced to lay flat by applying tension, pulling lengths of the wire mesh tight, and by additional fastening at each framing member. However, these methods are less effective with the tabs of a wire mesh formed by continuous transverse wires. The tabs may not pull tight by stretching, and in some instances they cannot be fastened by additional fasteners between framing members.

Hence there is a need for an improved lath produced with continuous transverse members such that the resulting product includes tabs that remain attached as part of the end product, and lay flat when installed.

BRIEF SUMMARY

A wire mesh product may be summarized as comprising a plurality of longitudinal members and a monolithic transverse member. The plurality of longitudinal members are arranged such that each of the plurality of longitudinal members is elongate along a longitudinal direction. Each of the plurality of longitudinal members is spaced apart from adjacent ones of the plurality of longitudinal members along a transverse direction that is perpendicular to the longitudinal direction, and the plurality of longitudinal members includes an outermost pair of longitudinal members.

The monolithic transverse member includes a plurality of transverse portions that are each elongate along the transverse direction, and further includes a plurality of longitudinal portions that each couple a pair of adjacent ones of the plurality of transverse portions. The plurality of transverse portions define a first cross-sectional shape within a plane perpendicular to the transverse direction, and the plurality of longitudinal portions define a second cross-sectional shape within a plane perpendicular to the longitudinal direction, and the first cross-sectional shape is different than the second cross-sectional shape.

The monolithic transverse member is secured to the plurality of longitudinal members such that the plurality of longitudinal portions are positioned outside an area defined between the outermost pair of longitudinal members.

A method of manufacturing a wire mesh product may be summarized as comprising positioning a plurality of longitudinal members such that each of the plurality of longitudinal members is elongate along a longitudinal direction, and such that each of the plurality of longitudinal members are spaced apart from adjacent ones of the plurality of longitudinal members along a transverse direction that is perpendicular to the longitudinal direction.

The method further comprises manipulating a monolithic transverse member to form a plurality of transverse portions that are each elongate along the transverse direction, and to further form a plurality of longitudinal portions that each couple a pair of adjacent ones of the plurality of transverse portions. The method further comprises securing the monolithic transverse member to the plurality of longitudinal members such that the plurality of longitudinal portions are positioned outside an area defined between an outermost pair of the plurality of longitudinal members, and applying a force to at least a portion of the monolithic transverse member that is positioned outside the area defined by the outermost pair of the plurality of longitudinal members.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with metal lath and machines and techniques to manufacture metal lath technologies have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The term "aligned" as used herein in reference to two elements along a direction means a straight line that passes through one of the elements and that is parallel to the direction will also pass through the other of the two elements. The term "between" as used herein in reference to a first element being between a second element and a third element with respect to a direction means that the first element is closer to the second element as measured along the direction than the third element is to the second element as measured along the direction. The term "between" includes, but does not require that the first, second, and third elements be aligned along the direction.

The term "plurality" as used herein means more than one. The terms "a portion" and "at least a portion" of a structure include the entirety of the structure.

The headings and Abstract of the Disclosure provided herein are for convenience only and do not interpret the scope or meaning of the embodiments.

Figure 1:
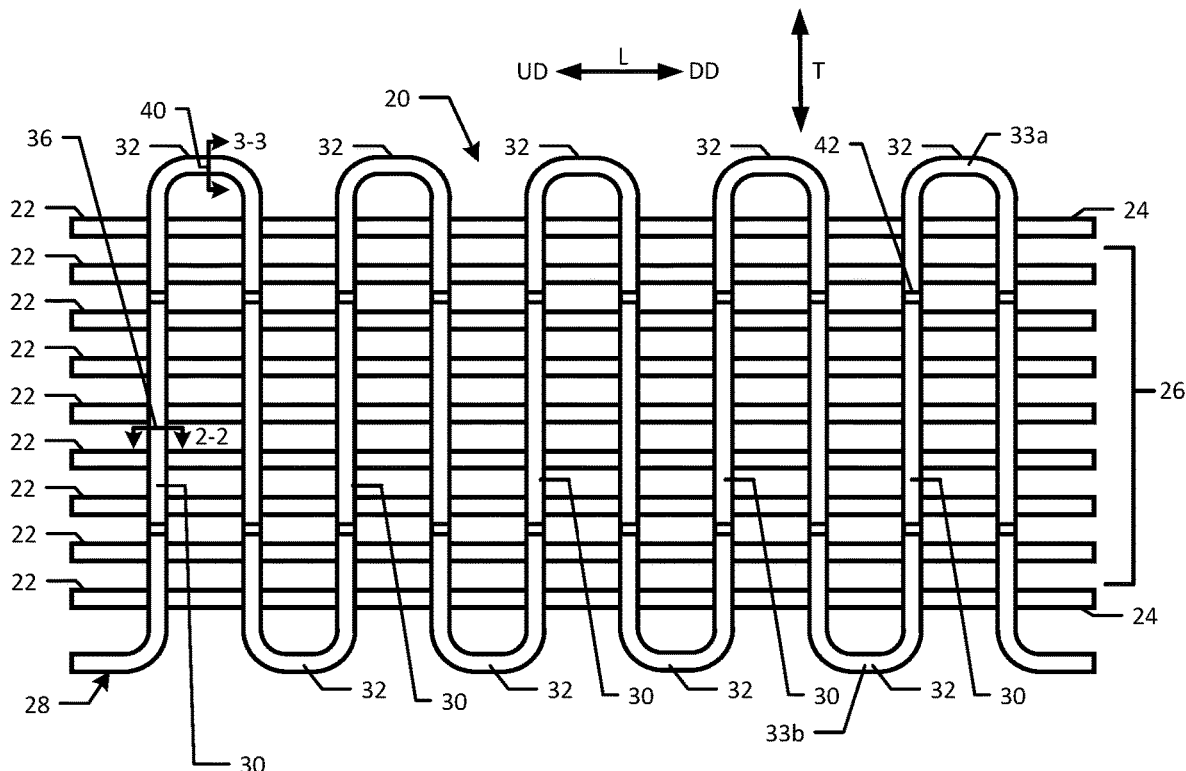
FIG. 1 is a top plan view of a lath, according to an embodiment.

Referring to FIG. 1, a lath 20, such as a wire mesh, can include a plurality of longitudinal members 22. According to one embodiment, the plurality of longitudinal members 22 can be arranged such that each of the plurality of longitudinal members 22 is elongate along a longitudinal direction L. As shown in the illustrated embodiment, the longitudinal direction L can include an upstream direction UD and a downstream direction DD, which is opposite the upstream direction UD. According to one aspect of the disclosure, during manufacture of the lath 20, the plurality of longitudinal members 22 travel in the downstream direction DD.

Each of the plurality of longitudinal members 22 can be spaced apart from adjacent ones of the plurality of longitudinal members 22 along a transverse direction T, which is perpendicular to the longitudinal direction L. According to one embodiment, each of the plurality of longitudinal members 22 is equidistant from the respective adjacent one(s) of the plurality of longitudinal members 22. The plurality of longitudinal members 22 can include an outermost pair of longitudinal members 24.

As shown, the outermost pair of longitudinal members 24 can include the pair of the plurality of longitudinal members 22 which are spaced farther apart, with respect to the transverse direction T, than any other pair of the plurality of longitudinal members 22. The outermost pair of longitudinal members 24 can define an area 26 therebetween within which all of the remaining plurality of longitudinal members 22 are located. According to one embodiment, each of the outermost pair of longitudinal members 24 has only one of the plurality of longitudinal members 22 adjacent to the respective one of the outermost pair of longitudinal members 24.

The lath 20 can further include a transverse member 28. According to one embodiment, the transverse member 28 is a monolithic, or one-piece, structure. According to another embodiment, the transverse member 28 is a multi-piece member, including for example a plurality of pieces welded together.

The transverse member 28 can include a plurality of transverse portions 30 that are each elongate along the transverse direction T. The transverse member 28 can further include a plurality of tabs or longitudinal portions 32 each coupling a pair of adjacent ones of the plurality of transverse portions 30. According to one embodiment, one or more of the plurality of longitudinal portions 32 are each elongate along the longitudinal direction L.

The plurality of longitudinal portions 32 can include a first series of longitudinal portions 33a located outside the area 26 on one side of the lath 20, such that the first series of longitudinal portions 33a are adjacent one of the outermost pair of longitudinal members 24, and further include a second series of longitudinal portions 33b located outside the area 26 on the other side of the lath 20, such that the second series of longitudinal portions 33b are adjacent the other of the outermost pair of longitudinal members 24. For clarity of illustration, only one of the first series of longitudinal portions 33a and only one of the second series of longitudinal portions 33b are called out in FIG. 1.

Each of the plurality of longitudinal portions 32 can define a respective length measured from one of the adjacent longitudinal portions 20 to the other of the adjacent longitudinal portions 20 that the respective longitudinal portion 32 couples. The length can be measured along the longitudinal direction L. According to one embodiment, the length of each of the plurality of longitudinal portions 32 can be between about 1 inch and about 6 inches. According to one embodiment, the length of each of the plurality of longitudinal portions 32 can be between about 1.4 inches and about 1.8 inches, for example about 1.6 inches. According to one embodiment, the length of each of the plurality of longitudinal portions 32 can be between about 3.0 inches and about 3.4 inches, for example about 3.2 inches. According to one embodiment, the length of each of the plurality of longitudinal portions 32 can be between about 4.6 inches and about 5.0 inches, for example about 4.8 inches. According to one embodiment, the length of each of the plurality of longitudinal portions 32 can be less than about 1 inch or more than about 6 inches.

Figure 2:
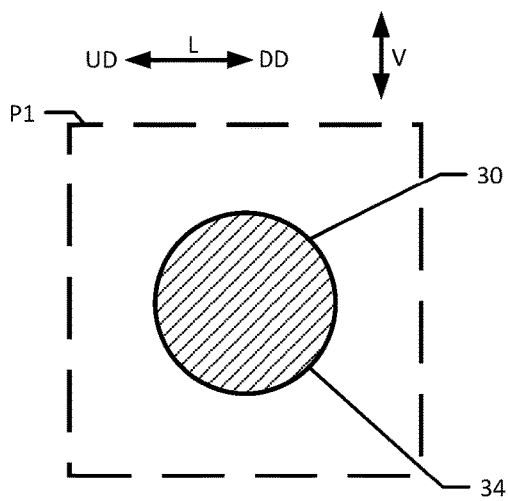
FIG. 2 is a cross-sectional view of a portion of the lath illustrated in FIG. 1 along line 2-2.
Figure 3:
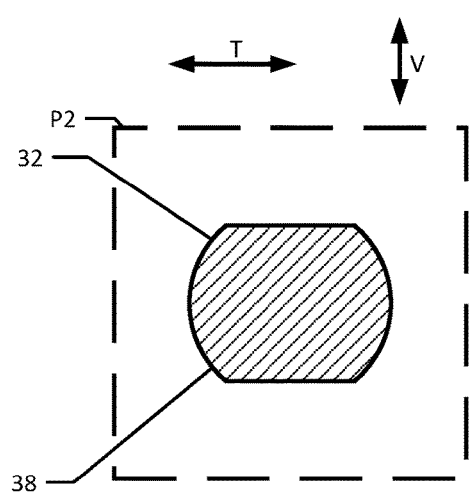
FIG. 3 is a cross-sectional view of another portion of the lath illustrated in FIG. 1 along line 3-3.

Referring to FIGS. 1 to 3, each of the plurality of transverse portions 30 can define a first cross-sectional shape 34 within a plane P1 (shown in FIG. 2), which is perpendicular to the transverse direction T. According to one aspect of the disclosure, each of the plurality of transverse portions 30 defines the first cross-sectional shape 34 at a location 36.

As shown in FIG. 2, the first cross-sectional shape 34 can be circular. According to one embodiment, the first cross-sectional shape can include some other geometric shape or a non-geometric shape. The first cross-sectional shape 34 can be constant along a portion, up to an entirety, of the plurality of transverse portions 30 within the area 26. The first cross-sectional shape 34 for each of the plurality of transverse portions 30 can be the same. Alternatively, different ones of the plurality of transverse portions 30 can define different first cross-sectional shapes 34.

The plurality of longitudinal portions 32 can define a second cross-sectional shape 38 within a plane P2 (shown in FIG. 3), which is perpendicular to the longitudinal direction L. According to one aspect of the disclosure, each of the plurality of longitudinal portions 32 defines the second cross-sectional shape 38 at a location 40. As shown, the first cross-sectional shape 34 can be different than the second cross-sectional shape 38.

As shown in FIG. 3, the second cross-sectional shape 38 can be a flattened circle or flattened oval. According to one embodiment, the second cross-sectional shape can include some other geometric shape or a non-geometric shape. The second cross-sectional shape 38 can be similar to the first cross-sectional shape 34 with the second cross-sectional shape 38 defining a smaller dimension in a direction, for example a vertical direction V that is perpendicular to both the longitudinal direction L and the transverse direction T. According to one aspect of the disclosure, the second cross-sectional shape 38 starts out the same as the first cross-sectional shape 34, and then a compressive force is applied to the plurality of longitudinal portions 32 thereby changing the second cross-sectional shape 38 to be different than the first cross-sectional shape 34.

The second cross-sectional shape 34 can be constant along a portion, up to an entirety, of each of the plurality of longitudinal portions 32. The second cross-sectional shape 38 for each of the plurality of longitudinal portions 32 can be the same. Alternatively, different ones of the plurality of longitudinal portions 32 can define different second cross-sectional shapes 38. For example, the second cross-sectional shape of the first series of longitudinal portions can define one shape, and the second cross-sectional shape of the second series of longitudinal portions can define another shape.

Referring again to FIG. 1, the lath 20 can include furring, which is a discontinuity 42, such as a bend, step, or spacer, that spaces a majority of the lath 20 from a wall, surface, substrate, or other generally planar surface upon which the lath 20 is placed during use. For clarity of illustration, only one discontinuity 42 is called out in FIG. 1. The discontinuity 42 can include a "U" shape, or a "V" shape, for example. The furring of the lath 20 can include a plurality of discontinuities 42 formed such that they are parallel to one another.

Referring to FIGS. 4 to 8, the lath 20 can include a plurality of transverse members. Use of additional transverse members can increase throughput of the systems used to produce the lath 20. However, additional transverse members can result in longer tabs, or longitudinal portions, which can exacerbate the circular memory tendencies of the material used for the transverse members. Use of the structures, methods, and systems disclosed herein can result in the use of additional transverse members, thereby increasing throughput, without sacrificing quality of the finished product, for example the lath 20 having a tendency to curve away from an underlying surface.

Figure 4:
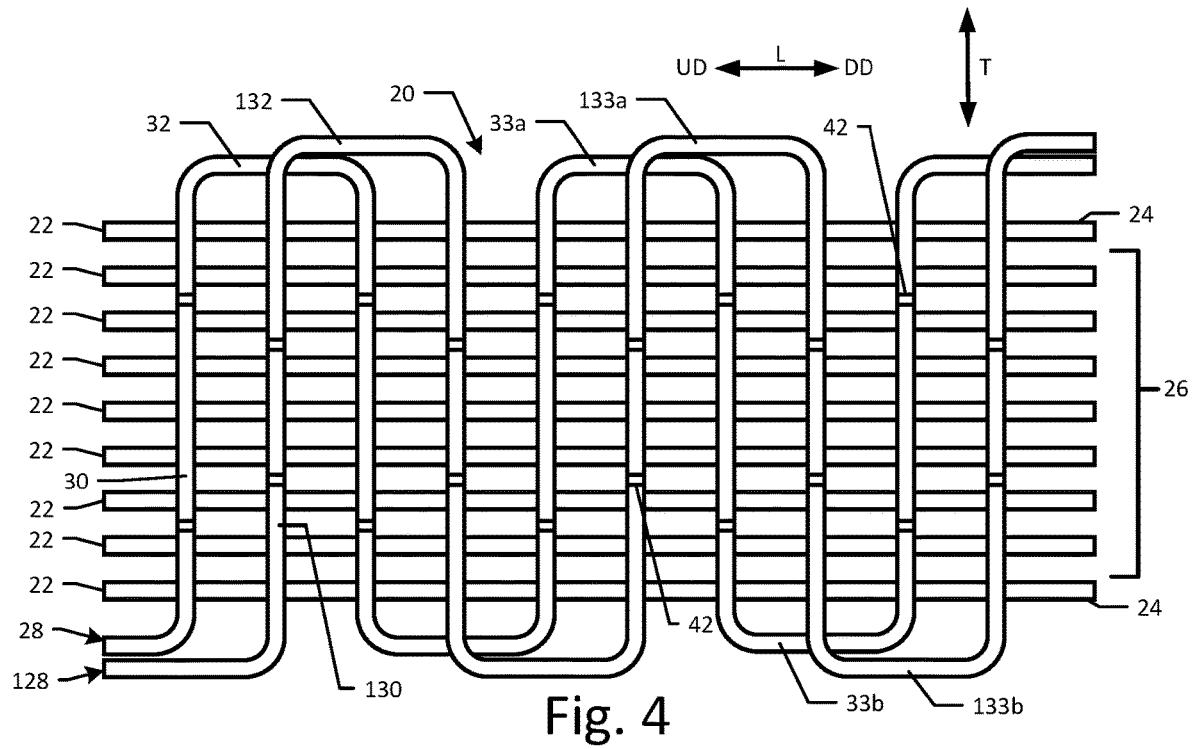
FIG. 4 is a top plan view of a lath, according to another embodiment.
Figure 5:
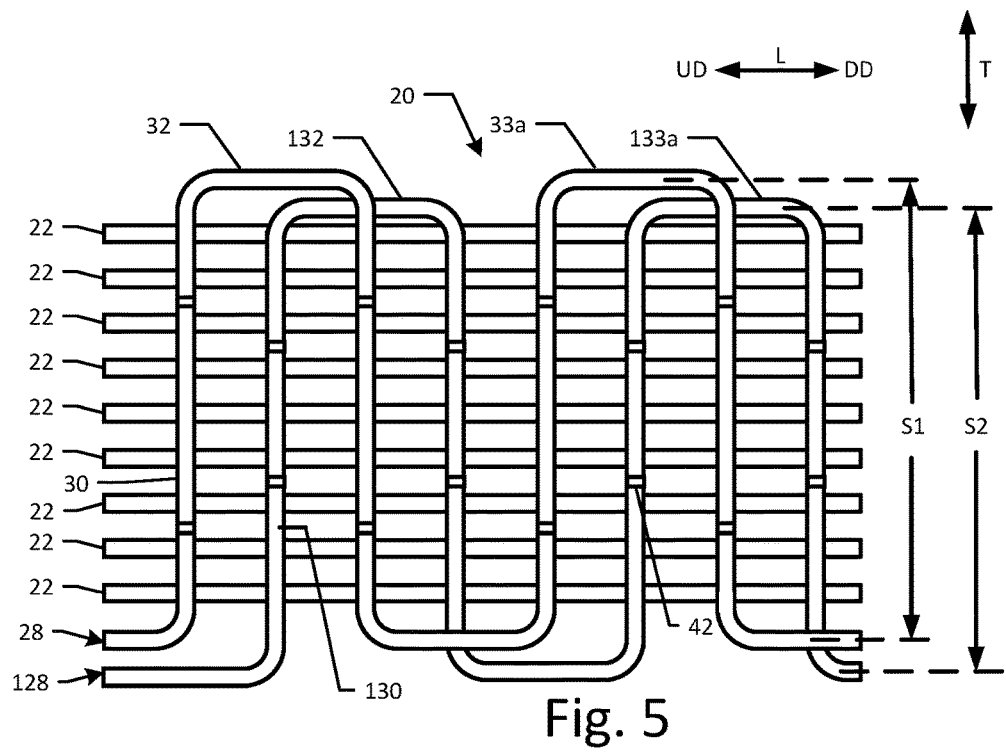
FIG. 5 is a top plan view of a portion of the lath illustrated in FIG. 4.

As shown in FIGS. 4 and 5, the plurality of transverse members can include the transverse member 28, also referred to herein as a first transverse member 28, and a second transverse member 128. The second transverse member 128 is similar to first transverse member 28 such that the disclosure of the first transverse member 28 is also applicable to the second transverse member 128. Reference numbers for similar elements for the second transverse member 128 are increased by 100 compared to their counterpart elements in the first transverse member 28.

Figure 6:
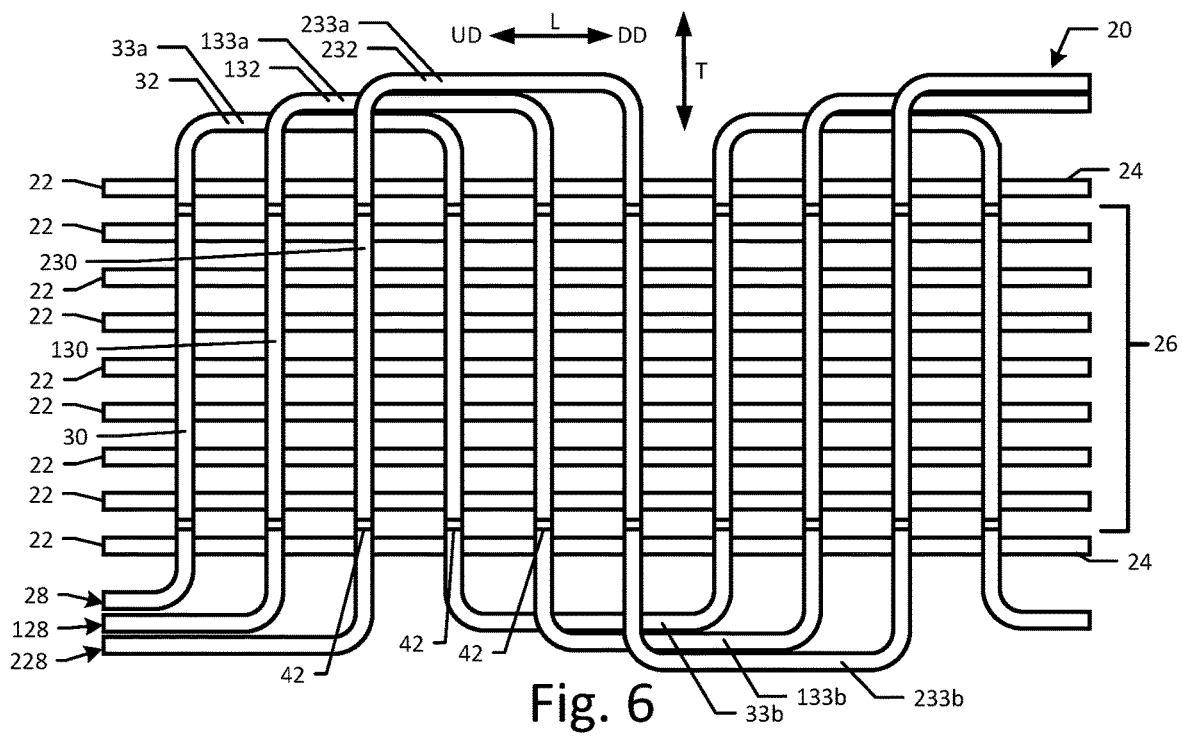
FIG. 6 is a top plan view of a lath, according to another embodiment.
Figure 7:
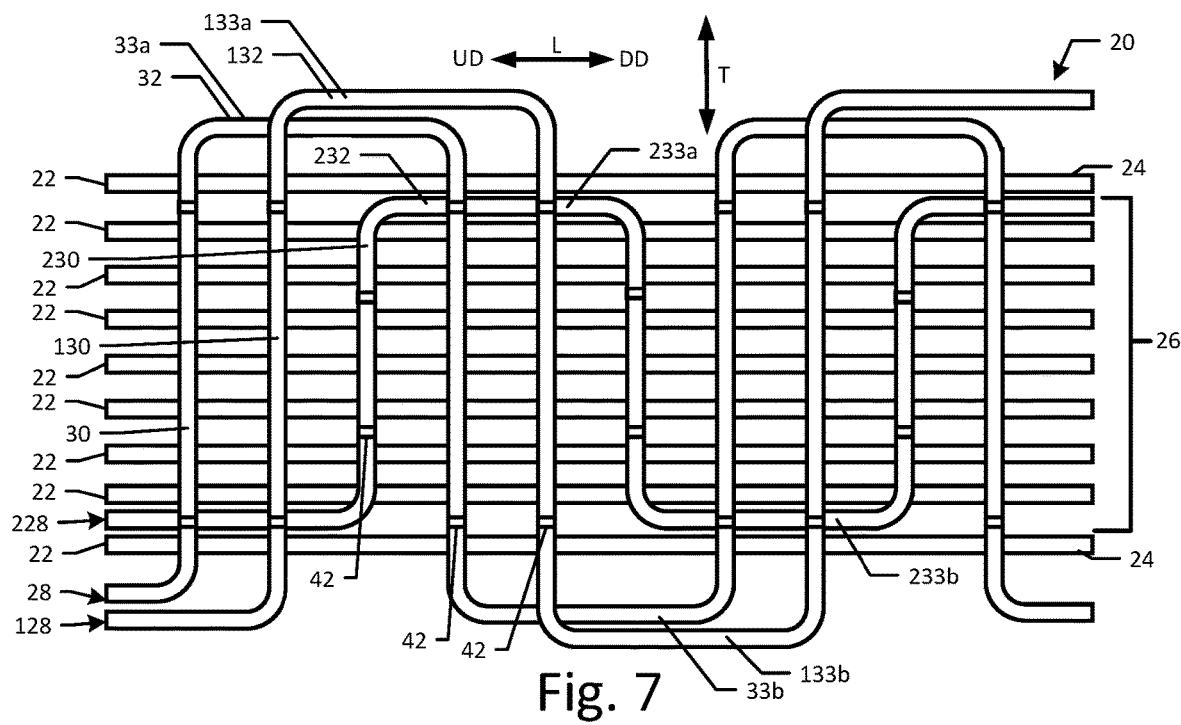
FIG. 7 is a top plan view of a lath, according to another embodiment.
Figure 8:
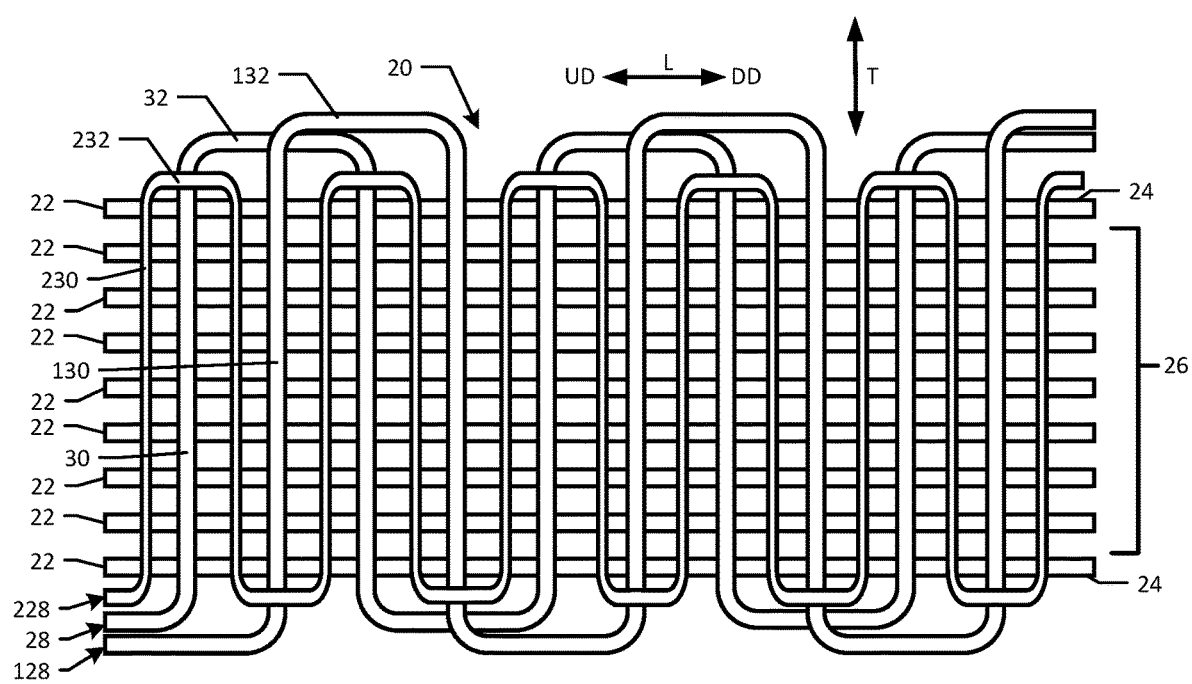
FIG. 8 is a top plan view of a lath, according to another embodiment.
Figure 9:
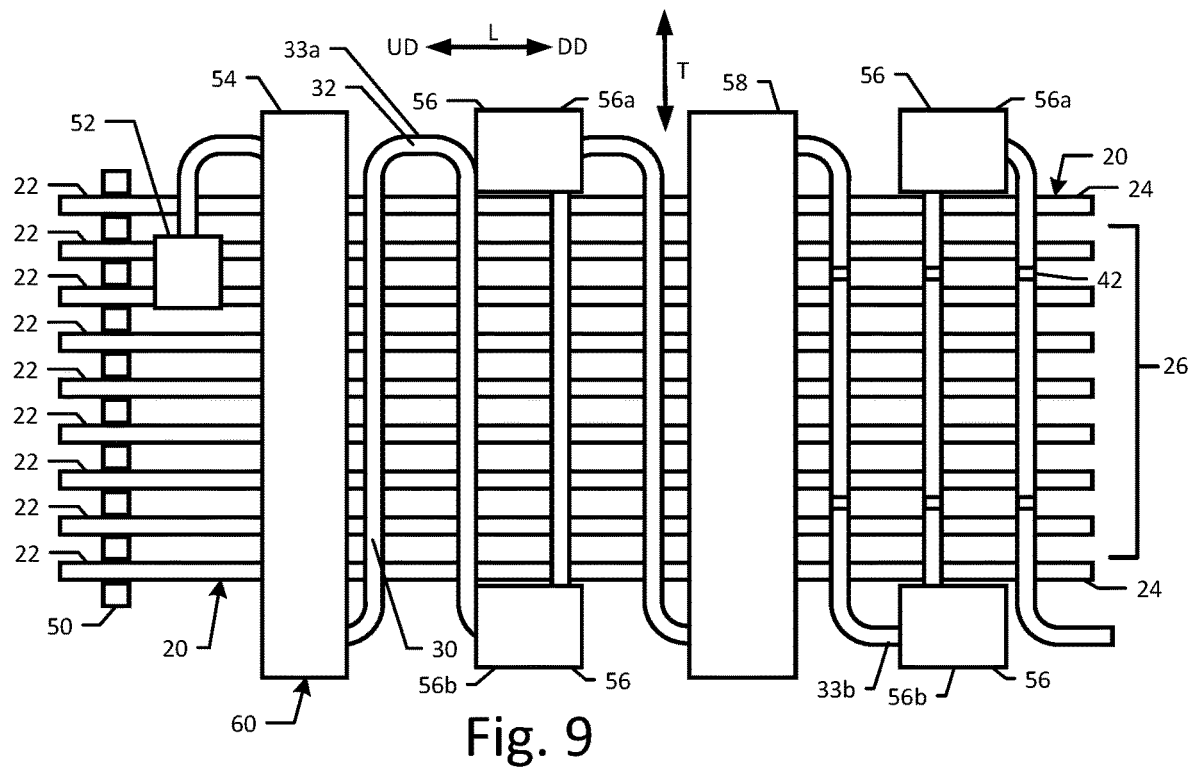
FIG. 9 is a top plan view of a lath manufacturing system, according to one embodiment.
Figure 10:
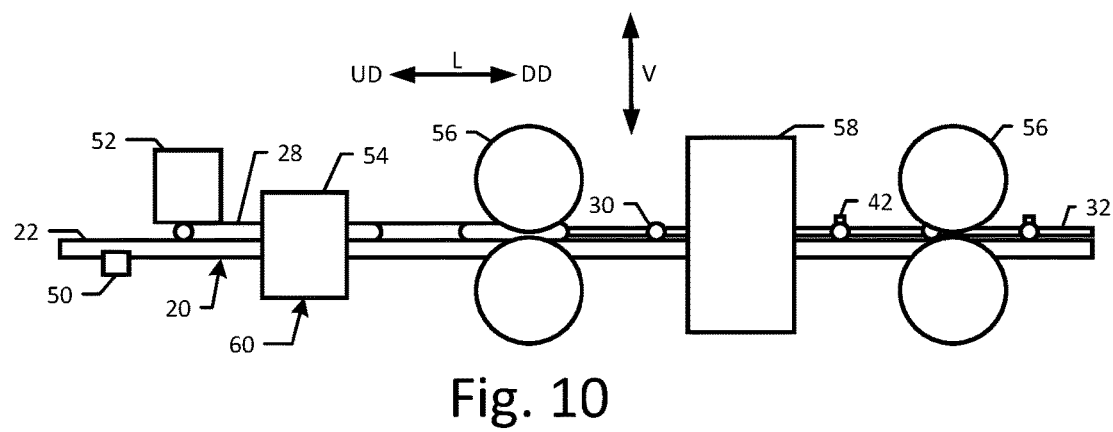
FIG. 10 is a side elevation view of the lath manufacturing system illustrated in FIG. 9.

As shown in FIGS. 6 to 8, the plurality of transverse members can include the first transverse member 28, the second transverse member 128, and a third transverse member 228. The third transverse member 228 is similar to first transverse member 28 such that the disclosure of the first transverse member 28 is also applicable to the third transverse member 128. Reference numbers for similar elements for the third transverse member 228 are increased by 200 compared to their counterpart elements in the first transverse member 28.

The second monolithic transverse member 128 can include a second plurality of transverse portions 130 that are elongate along the transverse direction T. As shown, the second plurality of transverse portions 130 can be elongate along the transverse direction T. The second monolithic transverse member 128 can include a second plurality of longitudinal portions 132. As shown, each of the second plurality of longitudinal portions 132 can couple a pair of adjacent ones of the second plurality of transverse portions 130.

Each of the plurality of transverse members can have a stroke length measured along the transverse direction T as shown in FIG. 5. According to one embodiment, the plurality of transverse members can each have a different stroke length. According to another embodiment, at least two of the plurality of transverse members can have equal stroke lengths. As shown in FIG. 5, the stroke length S1 of the first transverse member 28 can be equal to the stroke length S2 of the second transverse member 128. According to the embodiment shown in FIG. 4, the stroke length S1 of the first transverse member 28 can be shorter than the stroke length S2 of the second transverse member.

Referring to FIGS. 2 to 8, the second plurality of transverse portions 130 can define a third cross-sectional shape (not shown) similar to the first cross-sectional shape 34 of the first transverse member 28. The third cross-sectional shape can be defined within a plane perpendicular to the transverse direction T. The second plurality of longitudinal portions 132 can define a fourth cross-sectional shape (not shown) similar to the second cross-sectional shape 38 of the first transverse member 28. The fourth cross-sectional shape can be defined within a plane perpendicular to the longitudinal direction L. The third cross-sectional shape can be different than the fourth cross-sectional shape, according to one embodiment.

According to one embodiment, the first cross-sectional shape 34 is the same as the third cross-sectional shape. Alternatively, the first cross-sectional shape 34 can be different than the third cross-sectional shape. The first cross-sectional shape 34 and the third cross-sectional shape can be defined within the plane P1, or alternatively within different planes. The second cross-sectional shape 38 can be the same as the fourth cross-sectional shape. Alternatively, the second cross-sectional shape 38 can be different than the fourth cross-sectional shape.

Referring again to FIGS. 4 to 8, the second transverse member 128 can be secured to the plurality of longitudinal members 22 such that the second plurality of longitudinal portions 132 are positioned outside the area 26 defined between the outermost pair of longitudinal members 24. According to one embodiment, the first transverse member 28 and the second transverse member 128 can be secured to the plurality of longitudinal members 22 such that the first plurality of longitudinal portions 32 and the second plurality of longitudinal portions 132 are positioned adjacent, for example in contact with, each other. According to another embodiment, the first transverse member 28 and the second transverse member 128 can be secured to the plurality of longitudinal members 22 such that the first plurality of longitudinal portions 32 and the second plurality of longitudinal portions 132 define a gap that extends in the transverse direction T therebetween.

According to one embodiment, the first transverse member 28 and the second transverse member 128 can be secured to the plurality of longitudinal members 22 such that an offset is defined that extends in the transverse direction T from one of the outermost pair of longitudinal members 24 to the longitudinal portion (of either the first plurality of longitudinal portions 32 or the second plurality of longitudinal portions 132) closest to the one of the outermost pair of longitudinal members 24. According to one embodiment the offset is between about one-eighth of an inch and about one-half of an inch, for example one-quarter of an inch.

As shown in the illustrated embodiment, the first transverse member 28 and the second transverse member 128 can be secured to the plurality of longitudinal members 22 such that the first plurality of transverse portions 30 and the second plurality of transverse portions 130 alternate along the longitudinal direction L.

According to one embodiment, first transverse member 28 and the second transverse member 128 alternate such that as one travels along one of the plurality of longitudinal members 22 in either the upstream direction UD or the downstream direction DD, each of the first transverse portions 30 is adjacent two of the second transverse portions 130, and each of the second transverse portions 130 is adjacent two of the first transverse portions 30. Thus, as shown in FIG. 4, a pattern can be established along the plurality of longitudinal members 22, with respect to the longitudinal direction L, of one of the first transverse portions 30, one of the second transverse portions 130, one of the first transverse portions 30, one of the second transverse portions 130, and so on.

According to one embodiment, the first transverse member 28 and the second transverse member 128 can be secured to the plurality of longitudinal members 22 such that the second plurality of longitudinal portions 132 are positioned farther from the area 26 than the first plurality of longitudinal portions 32 are from the area 26. According to another embodiment, the first transverse member 28 and the second transverse member 128 can be secured to the plurality of longitudinal members 22 such that some of the first plurality of longitudinal portions 32 are positioned closer to the area 26 than the second plurality of longitudinal portions 132 are to the area 26. For example, the first series of longitudinal portions 33*a* can be closer to the area 26 than a first series of the longitudinal portions 133*a* of the second plurality of longitudinal portions 132, and the second series of longitudinal portions 33*b* can be farther from the area 26 than a second series of the longitudinal portions 133*b* of the second plurality of longitudinal portions 132.

According to an embodiment of the lath 20 that includes furring, either the first transverse member 28, the second transverse member 128, or both the first transverse member 28 and the second transverse member 128 can define the discontinuities 42. According to another embodiment, the lath 20 is devoid of furring.

Referring to FIGS. 6 to 8, the third monolithic transverse member 228 can include a third plurality of transverse portions 230 that are elongate along the transverse direction T. As shown, the third plurality of transverse portions 230 can be elongate along the transverse direction T. The third monolithic transverse member 228 can include a third plurality of longitudinal portions 232. As shown, each of the third plurality of longitudinal portions 232 can couple a pair of adjacent ones of the third plurality of transverse portions 230.

Referring to FIGS. 2 to 8, the third plurality of transverse portions 230 can define a fifth cross-sectional shape (not shown) similar to the first cross-sectional shape 34 of the first transverse member 28. The fifth cross-sectional shape can be defined within a plane perpendicular to the transverse direction T. The third plurality of longitudinal portions 232 can define a sixth cross-sectional shape (not shown) similar to the second cross-sectional shape 38 of the first transverse member 28. The sixth cross-sectional shape can be defined within a plane perpendicular to the longitudinal direction L. The fifth cross-sectional shape can be different than the sixth cross-sectional shape, according to one embodiment.

According to one embodiment, the first cross-sectional shape 34 is the same as at least one of the third cross-sectional shape and the fifth cross-sectional shape. Alternatively, the first cross-sectional shape 34 can be different than at least one of the third cross-sectional shape and the fifth cross-sectional shape. The first cross-sectional shape 34 and at least one of the third cross-sectional shape and the fifth cross-sectional shape can be defined within the plane P1, or alternatively within different planes. The second cross-sectional shape 38 can be the same as at least one of the fourth cross-sectional shape and the sixth cross-sectional shape. Alternatively, the second cross-sectional shape 38 can be different than at least one of the fourth cross-sectional shape and the sixth cross-sectional shape.

Referring again to FIGS. 6 to 8, the plurality of transverse members can be secured to the plurality of longitudinal members 22 such that the plurality of longitudinal portions of each of the plurality of transverse members are positioned outside the area 26 defined between the outermost pair of longitudinal members 24, as shown in FIGS. 6 and 8. Alternatively, the plurality of transverse members can be secured to the plurality of longitudinal members 22 such that the plurality of longitudinal portions of one or more of the plurality of transverse members are positioned inside the area 26 defined between the outermost pair of longitudinal members 24, as shown in FIG. 7. For example, as shown in the illustrated embodiment of FIG. 7, the third transverse member 228 can be secured to the plurality of longitudinal members 22 such that at least some, for example all, of the third plurality of longitudinal portions 232 are positioned inside the area 26 defined between the outermost pair of longitudinal members 24.

As shown in FIGS. 6 and 7, the first transverse member 28, the second transverse member 128, and the third transverse member 228 can be secured to the plurality of longitudinal members 22 such that the first plurality of transverse portions 30, the second plurality of transverse portions 130, and the third plurality of transverse portions 230 alternate along the longitudinal direction L.

According to one embodiment, first transverse member 28, the second transverse member 128, and the third transverse member 228 alternate such that as one travels along one of the plurality of longitudinal members 22 in either the upstream direction UD or the downstream direction DD, each of the first plurality of transverse portions 30 is adjacent one of the second plurality of transverse portions 130 and one of the third plurality of transverse portions 230, each of the second plurality of transverse portions 130 is adjacent one of the first plurality of transverse portions 30 and one of the third plurality of transverse portions 230, and each of the third plurality of transverse portions 230 is adjacent one of the first plurality of transverse portions 30 and one of the second plurality of transverse portions 130.

Thus, as shown in FIGS. 6 and 7, a pattern can be established along the plurality of longitudinal members 22, with respect to the longitudinal direction L, of one of the first plurality of transverse portions 30, one of the second plurality of transverse portions 130, one of the third plurality of transverse portions 230, one of the first plurality of transverse portions 30, one of the second plurality of transverse portions 130, one of the third plurality of transverse portions 230, and so on.

According to one embodiment, the first transverse member 28, the second transverse member 128, and the third transverse member 228 can be secured to the plurality of longitudinal members 22 such that the third plurality of longitudinal portions 232 are positioned farther from the area 26 than the second plurality of longitudinal portions 132 are from the area 26, which are positioned farther from the area 26 than the first plurality of longitudinal portions 32 are from the area 26.

According to another embodiment, the first transverse member 28, the second transverse member 128, and the third transverse member 228 can be secured to the plurality of longitudinal members 22 such that some of the first plurality of longitudinal portions 32 are positioned closer to the area 26 than the third plurality of longitudinal portions 232 are to the area 26. For example, the first series of longitudinal portions 33a can be closer to the area 26 than a first series of the longitudinal portions 233a of the third plurality of longitudinal portions 232, and the second series of longitudinal portions 33b can be farther from the area 26 than a second series of the longitudinal portions 233b of the third plurality of longitudinal portions 232.

According to an embodiment of the lath 20 that includes furring, either the first transverse member 28, the second transverse member 128, the third transverse member 228, or any combination of the first transverse member 28, the second transverse member 128, and the third transverse member 228 can define the discontinuities 42. According to another embodiment, the lath 20 is devoid of furring.

As shown in FIG. 8, a pattern can be established along the plurality of longitudinal members 22, with respect to the longitudinal direction L, of one of the first plurality of transverse portions 30, one of the third plurality of transverse portions 230, one of the second plurality of transverse portions 130, one of the third plurality of transverse portions 230, one of the first plurality of transverse portions 30, one of the third plurality of transverse portions 230, one of the second plurality of transverse portions 130, one of the third plurality of transverse portions 230, and so on.

According to one embodiment, the first transverse member 28, the second transverse member 128, and the third transverse member 228 can be secured to the plurality of longitudinal members 22 such that the third plurality of longitudinal portions 232 are positioned closer to the area 26 than the first plurality of longitudinal portions 32 are from the area 26, which are positioned closer to the area 26 than the second plurality of longitudinal portions 132 are from the area 26. According to another embodiment, at least some, for example all, of the third plurality of longitudinal portions 232 are positioned within the area 26.

Referring to FIGS. 1 to 10, a method of manufacturing a lath 20 includes positioning the plurality of longitudinal members 22 such that each of the plurality of longitudinal members 22 is elongate along the longitudinal direction L, and such that each of the plurality of longitudinal members 22 are spaced apart from adjacent ones of the plurality of longitudinal members 22 along the transverse direction T. The positioning can be performed by, for example, a series of guide rails 50.

The method can further include manipulating at least one of the plurality of transverse members, for example the first transverse member 28, to form the first plurality of transverse portions 30, such that the first plurality of transverse portions 30 are each elongate along the transverse direction T, and to further form the first plurality of longitudinal portions 32. The manipulating can be performed by, for example, a reciprocating loom 52. The reciprocating loom 52, according to one embodiment, can travel back and forth along the transverse direction T relative to the plurality of longitudinal members 22 forming the first plurality of transverse portions 30 and the first plurality of longitudinal portions 32 and positioning them relative to the plurality of longitudinal members 22. According to one embodiment, the plurality of longitudinal members 22 advance in the downstream direction DD relative to the reciprocating loom 52.

The method can further include securing the first transverse member 28 to the plurality of longitudinal members 22 such that the plurality of longitudinal portions 32 are positioned outside the area 26 defined between the outermost pair of longitudinal members 24. The securing can be performed by a welder 54, according to one embodiment. The welder 54 can weld a plurality of intersections of the plurality of transverse portions 30 and the plurality of longitudinal members 22. According to one aspect of the disclosure the welder welds every intersection of the plurality of transverse portions 30 and the plurality of longitudinal members 22.

The method can further include applying a force to at least a portion of the first transverse member 28, that portion being positioned outside the area 26. According to one embodiment, the force is applied by at least one pair of rollers 56. As shown in the illustrated embodiment, the at least one pair of rollers 56 can be positioned such that they are aligned with the plurality of longitudinal portions 32 such that the plurality of longitudinal portions 32 pass through the at least one pair of rollers 56 whereby the force is applied to the plurality of longitudinal portions 32. The at least one pair of rollers 56 can include a first pair of rollers 56a aligned with the first series of longitudinal portions 33a and a second pair of rollers 56b aligned with the second series of longitudinal portions 33b.

The force, according to one embodiment, can be applied in a direction perpendicular to both the longitudinal direction and the transverse direction, for example the vertical direction V. The force can include a compressive force. According to one aspect of the disclosure, the force is sufficient to plastically deform the portions of the lath 20 to which the force is applied. The plastic deformation can result in the difference in shapes of the first cross-sectional shape 34 and the second cross-sectional shape 38. Applying the force can include avoiding applying the force to any portion of the first transverse member 28 positioned within the area 26.

According to one aspect of the disclosure, the force can be applied upstream of where the first transverse member 28 is secured to the plurality of longitudinal members 22. According to another aspect of the disclosure, the force can be applied downstream of where the first transverse member 28 is secured to the plurality of longitudinal members 22. According to another aspect of the disclosure, the force can be applied both upstream and downstream of where the first transverse member 28 is secured to the plurality of longitudinal members 22. For example, the force can be applied to the first plurality of longitudinal portions 32 upstream of the welder 54, and another force, either the same force or a different force, can be applied to the first plurality of longitudinal portions 32 downstream of the securing.

According to one embodiment, the method can include furring the lath 20. Furring can include forming a plurality of the discontinuities 42 in one or more of the plurality of longitudinal members 22, the first transverse member 28, the second transverse member 128, the third transverse member 228, or any other of the plurality of transverse members. Furring the lath 20 can be performed by at least one furring machine 58. Furring the lath 20 can be performed downstream of where the first transverse member 28 is secured to the plurality of longitudinal members 22, and downstream of where the force is applied to the first transverse member 28, as shown in the illustrated embodiment. Alternatively, the lath 20 can be furred upstream of one or both of where the first transverse member 28 is secured to the plurality of longitudinal members 22 and where the force is applied to the first transverse member 28.

According to one aspect of the disclosure, additional ones of the plurality of the transverse members, for example the second transverse member 128 and the third transverse member 228, can be manipulated, secured, have a force applied, furred, or any combination thereof similarly to as described in reference to the first transverse member 28. The manipulating, securing, applying, and furring can be done to the additional ones of the plurality of transverse members at the same location as the first transverse member 28, or at different locations. For example, the welder 54 may be a first welder, and the second transverse member 128 may be secured to the plurality of longitudinal members 22 by a second welder positioned downstream of the first welder 54.

According to one embodiment, a lath manufacturing system 60 includes a positioning assembly, such as the plurality of guide rails 50, to position the plurality of longitudinal members 22 such that each of the plurality of longitudinal members is elongate along the longitudinal direction L, and such that each of the plurality of longitudinal members 22 are spaced apart from adjacent ones of the plurality of longitudinal members 22 along the transverse direction T. The lath manufacturing system 60 can further include a manipulating assembly, such as the reciprocating loom 52, to manipulate the first transverse member 28 to form the plurality of transverse portions 30, and to further form the plurality of longitudinal portions 32.

The lath manufacturing system 60 can further include a securing assembly, such as the welder 54, to secure the first transverse member 28 to the plurality of longitudinal members 22 such that the plurality of longitudinal portions 32 are positioned outside the area 26. The lath manufacturing system can further include a force application assembly, such as the at least one pair of rollers 56, to apply the force to at least a portion of the first transverse member 28 that is positioned outside the area 26. The lath manufacturing system 60 can further include a furring assembly, such as the furring machine 58, to form a plurality of the discontinuities 42 in the first transverse member 28.

According to one embodiment, any one or more of the positioning, manipulating, securing, force application, and furring assemblies of the lath manufacturing system 60 can include a plurality of the described components. For example, the manipulating assembly can include a first reciprocating loom to manipulate the first transverse member 28, and a second reciprocating loom to manipulate the second transverse member 128.

According to one embodiment, any one or more of the positioning, manipulating, securing, force application, and furring assemblies of the lath manufacturing system 60 can perform the described function on more than one of the transverse members. For example one of the pair of rollers 56 of the force application assembly can apply the force to portions of both the first transverse member 28 and the second transverse member 128.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art.

Many of the methods described herein can be performed with variations. For example, many of the methods may include additional acts, omit some acts, and/or perform acts in a different order than as illustrated or described.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to U.S. Provisional Application No. 62/926,346, filed Oct. 25, 2019, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A lath comprising:
   a plurality of longitudinal members arranged such that each of the plurality of longitudinal members is elongate along a longitudinal direction, each of the plurality of longitudinal members spaced apart from adjacent ones of the plurality of longitudinal members along a transverse direction that is perpendicular to the longitudinal direction, the plurality of longitudinal members including an outermost pair of longitudinal members; and
   a monolithic transverse member including a plurality of transverse portions that are each elongate along the transverse direction, and further including a plurality of longitudinal portions each coupling a pair of adjacent ones of the plurality of transverse portions, the plurality of transverse portions defining a first cross-sectional shape within a plane perpendicular to the transverse direction, the plurality of longitudinal portions defining a second cross-sectional shape within a plane perpendicular to the longitudinal direction, and the first cross-sectional shape being different than the second cross-sectional shape,
   wherein the monolithic transverse member is secured to the plurality of longitudinal members such that the plurality of longitudinal portions are positioned outside an area defined between the outermost pair of longitudinal members.

2. The lath of claim 1 wherein the plurality of longitudinal portions are each elongate along the longitudinal direction.

3. The lath of claim 1 wherein the monolithic transverse member is furred.

4. The lath of claim 1 wherein the monolithic transverse member is a first monolithic transverse member, the plurality of transverse portions is a first plurality of transverse portions, and the plurality of longitudinal portions is a second plurality of longitudinal portions, the lath further comprising:
   a second monolithic transverse member secured to the plurality of longitudinal members, the second monolithic transverse member including a second plurality of transverse portions that are elongate along the transverse direction, and further including a second plurality of longitudinal portions each coupling a pair of adjacent ones of the second plurality of transverse portions, the second plurality of transverse portions defining a third cross-sectional shape within a plane perpendicular to the transverse direction, the second plurality of longitudinal portions defining a fourth cross-sectional shape within a plane perpendicular to the longitudinal direction, and the third cross-sectional shape being different than the fourth cross-sectional shape.

5. The lath of claim 4 wherein the second monolithic transverse member is secured to the plurality of longitudinal members such that the second plurality of longitudinal portions are positioned outside an area defined between the outermost pair of longitudinal members.

6. The lath of claim 4 wherein the second monolithic transverse member is secured to the plurality of longitudinal members such that the second plurality of longitudinal portions are positioned inside an area defined between the outermost pair of longitudinal members.

7. The lath of claim 4 wherein the first monolithic transverse member and the second monolithic transverse member are secured to the plurality of longitudinal members such that the first plurality of transverse portions and the second plurality of transverse portions alternate along the longitudinal direction.

8. The lath of claim 4 wherein the first cross-sectional shape is the same as the third cross-sectional shape.

9. The lath of claim 4 wherein the first cross-sectional shape and the third cross-sectional shape are defined within the same plane.

10. The lath of claim 4 wherein the second cross-sectional shape is the same as the fourth cross-sectional shape.

11. The lath of claim 4 wherein the first monolithic transverse member is furred, the second monolithic transverse member is furred, or both the first and second monolithic transverse members are furred.

12. The lath of claim 4 wherein the first monolithic transverse member establishes a first stroke length measured along one of the first plurality of transverse portions from one of the first plurality of longitudinal portions to another of the first plurality of longitudinal portions, the second monolithic transverse member establishes a second stroke length measured along one of the second plurality of transverse portions from one of the second plurality of longitudinal portions to another of the second plurality of longitudinal portions, and the first stroke length is equal to the second stroke length.

13. The lath of claim 4, further comprising:
   a third monolithic transverse member secured to the plurality of longitudinal members, the third monolithic transverse member including a third plurality of transverse portions that are elongate along the transverse direction, and further including a third plurality of longitudinal portions each coupling a pair of adjacent ones of the third plurality of transverse portions, the third plurality of transverse portions defining a fifth cross-sectional shape within a plane perpendicular to the transverse direction, the third plurality of longitudinal portions defining a sixth cross-sectional shape within a plane perpendicular to the longitudinal direction, and the fifth cross-sectional shape being different than the sixth cross-sectional shape.

14. The lath of claim 13 wherein the first monolithic transverse member, the second monolithic transverse member, and the third monolithic transverse member are secured to the plurality of longitudinal members such that:

each of the first plurality of transverse portions is adjacent one of the second plurality of transverse portions and is adjacent one of the third plurality of transverse portions;

each of the second plurality of transverse portions is adjacent one of the first plurality of transverse portions and is adjacent one of the third plurality of transverse portions; and each of the third plurality of transverse portions is adjacent one of the first plurality of transverse portions and is adjacent one of the second plurality of transverse portions.

\* \* \* \* \*